US012634803B2

(12) United States Patent
Ryu et al.

(10) Patent No.: US 12,634,803 B2
(45) Date of Patent: **\*May 19, 2026**

(54) UNIFIED ACCESS CONTROL WITH NETWORK SLICE GROUPING

(71) Applicant: Boost SubscriberCo L.L.C., Englewood, CO (US)

(72) Inventors: Jinsook Ryu, Oakton, VA (US); Mehdi Alasti, Arlington, VA (US)

(73) Assignee: Boost SubscriberCo L.L.C., Englewood, CO (US)

( \* ) Notice: Subject to any disclaimer, the term of this patent is extended or adjusted under 35 U.S.C. 154(b) by 811 days.

This patent is subject to a terminal disclaimer.

(21) Appl. No.: 17/834,069

(22) Filed: Jun. 7, 2022

(65) Prior Publication Data

US 2023/0397088 A1     Dec. 7, 2023

(51) Int. Cl.
H04W 48/08 (2009.01)
H04W 48/18 (2009.01)

(52) U.S. Cl.
CPC ........... H04W 48/08 (2013.01); H04W 48/18 (2013.01)

(58) Field of Classification Search
CPC .............................. H04W 48/18; H04W 48/08
See application file for complete search history.

(56) References Cited

U.S. PATENT DOCUMENTS

| | | | | |
|---|---|---|---|---|
| 12,408,104 | B2 * | 9/2025 | Ryu | H04W 48/18 |
| 2019/0159108 | A1 * | 5/2019 | Lee | H04W 48/10 |

| | | | | |
|---|---|---|---|---|
| 2020/0296631 | A1 | 9/2020 | Young et al. | |
| 2021/0099945 | A1 * | 4/2021 | Watfa | H04W 48/18 |
| 2021/0219190 | A1 * | 7/2021 | Cao | H04W 88/16 |
| 2021/0385742 | A1 * | 12/2021 | Liao | H04W 48/02 |
| 2021/0392501 | A1 * | 12/2021 | Buyukdura | H04L 41/0893 |
| 2023/0007568 | A1 * | 1/2023 | Shetty | H04W 28/04 |

(Continued)

OTHER PUBLICATIONS

Ericsson et al: "Slice 'SD ranges'", 3GPP Draft; CP-212026, 3$^{rd}$ Generation Partnership Project (3GPP), Mobile Competence Centre; 650, Route Des Lucioles; F-06921 Sophia-Antipolis Cedex; France, vol. CT WG4, No. E-Meeting; 2210817-20210827 Aug. 30, 2021, XP052044217, Retrieved from the Internet: URL: https://ftp.3gpp.org/3guinternal/3GPP_Ultimate_CRPacks/CP-212026.zip 23003_CR0620_(Rel-17)_C4-214672-Slice-SD-Ranges-23003.docx [retrieved on Aug. 30, 2021] p. 1-p. 5.

(Continued)

*Primary Examiner* — Steven S Kelley
(74) *Attorney, Agent, or Firm* — Kilpatrick Townsend & Stockton LLP

(57)     ABSTRACT

Embodiments provide novel approaches to handling network slice groups in access stratum and non-access stratum communications in a cellular communication network. Novel slice identification schema can support group-level identification of groups of network slices without individually listing the network slices. Some embodiments implement a slice identifier that supports wildcard slice/service type (SST) options and/or wildcard slice differentiator (SD) options to support wildcard-enabled slice groups. Some embodiments enable use of such wildcard-enabled slice groups in context of unified access control. Some embodiments introduce a novel criteria type to unified access control to expressly support flexible slice grouping.

20 Claims, 9 Drawing Sheets

(56) References Cited

U.S. PATENT DOCUMENTS

| | | | |
|---|---|---|---|
| 2023/0037553 A1 | 2/2023 | Shih et al. | |
| 2023/0072956 A1 | 3/2023 | Ding et al. | |
| 2023/0109272 A1 | 4/2023 | Ryu et al. | |
| 2023/0132096 A1 | 4/2023 | Shekhar et al. | |
| 2023/0156584 A1 | 5/2023 | Choi et al. | |
| 2023/0345307 A1 | 10/2023 | Forsman et al. | |
| 2023/0397088 A1 | 12/2023 | Ryu et al. | |
| 2023/0397091 A1* | 12/2023 | Ryu | H04W 76/10 |
| 2023/0397260 A1 | 12/2023 | Yilmaz et al. | |
| 2024/0015599 A1* | 1/2024 | Godin | H04W 36/22 |
| 2024/0031929 A1 | 1/2024 | Ryu et al. | |
| 2024/0073848 A1 | 2/2024 | Ryu et al. | |
| 2024/0214822 A1 | 6/2024 | Buyukdura | |

OTHER PUBLICATIONS

Nokia et al.: "New solutions for KI2: UE determination of the N3IWF that supports the slices targeted by the UE", 3GPP Draft; S2-2203510, 3rd Generation Partnership Project (3GPP), Mobile Competence Centre; 650, Route Des Lucioles; F-06921 Sophia-Antipolis Cedex; France, vol. SA WG2, No. Elbonia; Apr. 6, 2022-Apr. 12, 2022, Apr. 12, 2022, XP052135597, Retrieved from the Internet: URL: https://ftp.3gpp.org/tsg_sa/WG2_Arch/TSGS2_160E_Electronic_2022-04/INBOX/S2-2203610.zipS2-2203610 was2202r02.docx [retrieved on Apr. 12, 2022] p. 1-p. 5.

* cited by examiner

300a

| SST Name 332 | SST Value 334 | SST Service Description 336 |
|---|---|---|
| eMBB | 001 | 5G enhanced mobile broadband |
| URLLC | 002 | Ultra-reliable low-latency communications |
| MIoT | 003 | Massive IoT |
| V2X | 004 | Vehicle-to-X |
| HMTC | 005 | High-performance machine-type comm'n |
| Standard | 006-127 | TBD |
| VNO Specific | 128-255 | Operator-defined |

300b

| SD Value 344 | SD Description 346 |
|---|---|
| #000000 - #FFFFFF | Operator defined assignment to tenant |

400a

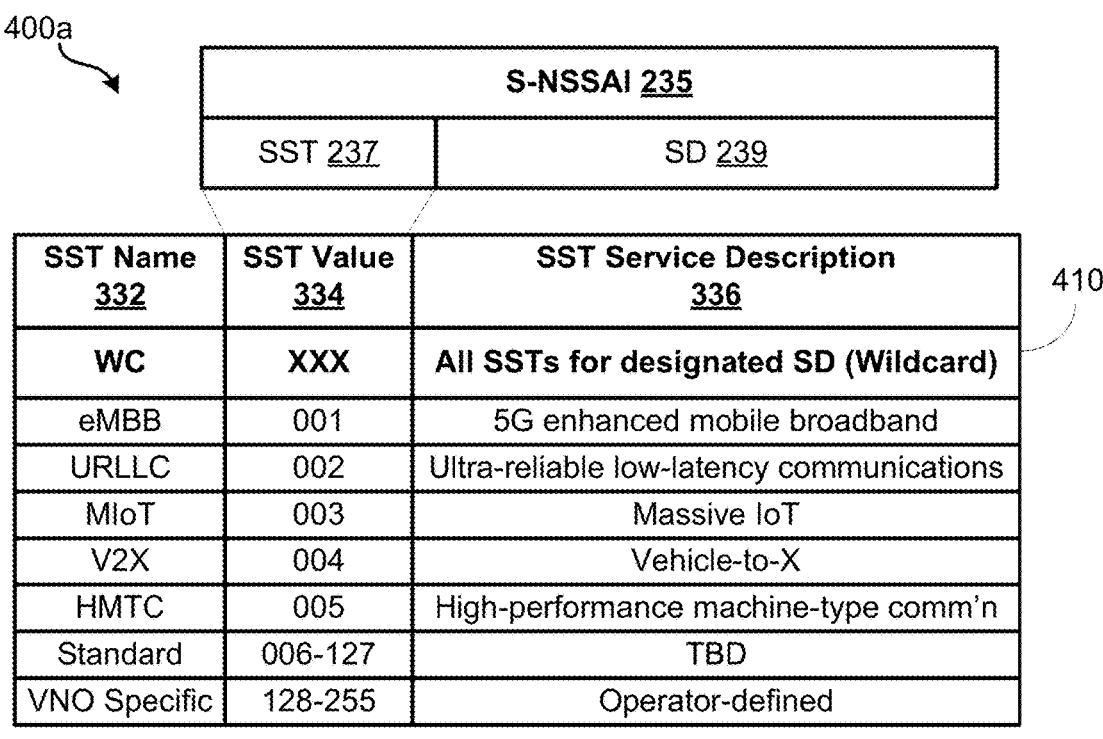

| SST Name 332 | SST Value 334 | SST Service Description 336 |
|---|---|---|
| WC | XXX | All SSTs for designated SD (Wildcard) |
| eMBB | 001 | 5G enhanced mobile broadband |
| URLLC | 002 | Ultra-reliable low-latency communications |
| MIoT | 003 | Massive IoT |
| V2X | 004 | Vehicle-to-X |
| HMTC | 005 | High-performance machine-type comm'n |
| Standard | 006-127 | TBD |
| VNO Specific | 128-255 | Operator-defined |

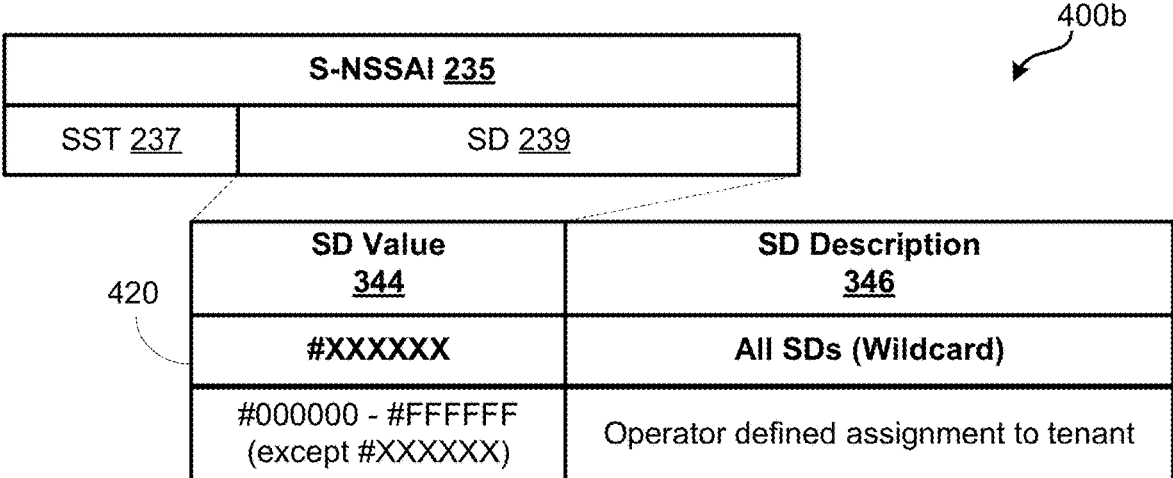

| SD Value 344 | SD Description 346 |
|---|---|
| #XXXXXX | All SDs (Wildcard) |
| #000000 - #FFFFFF (except #XXXXXX) | Operator defined assignment to tenant |

FIG. 4B

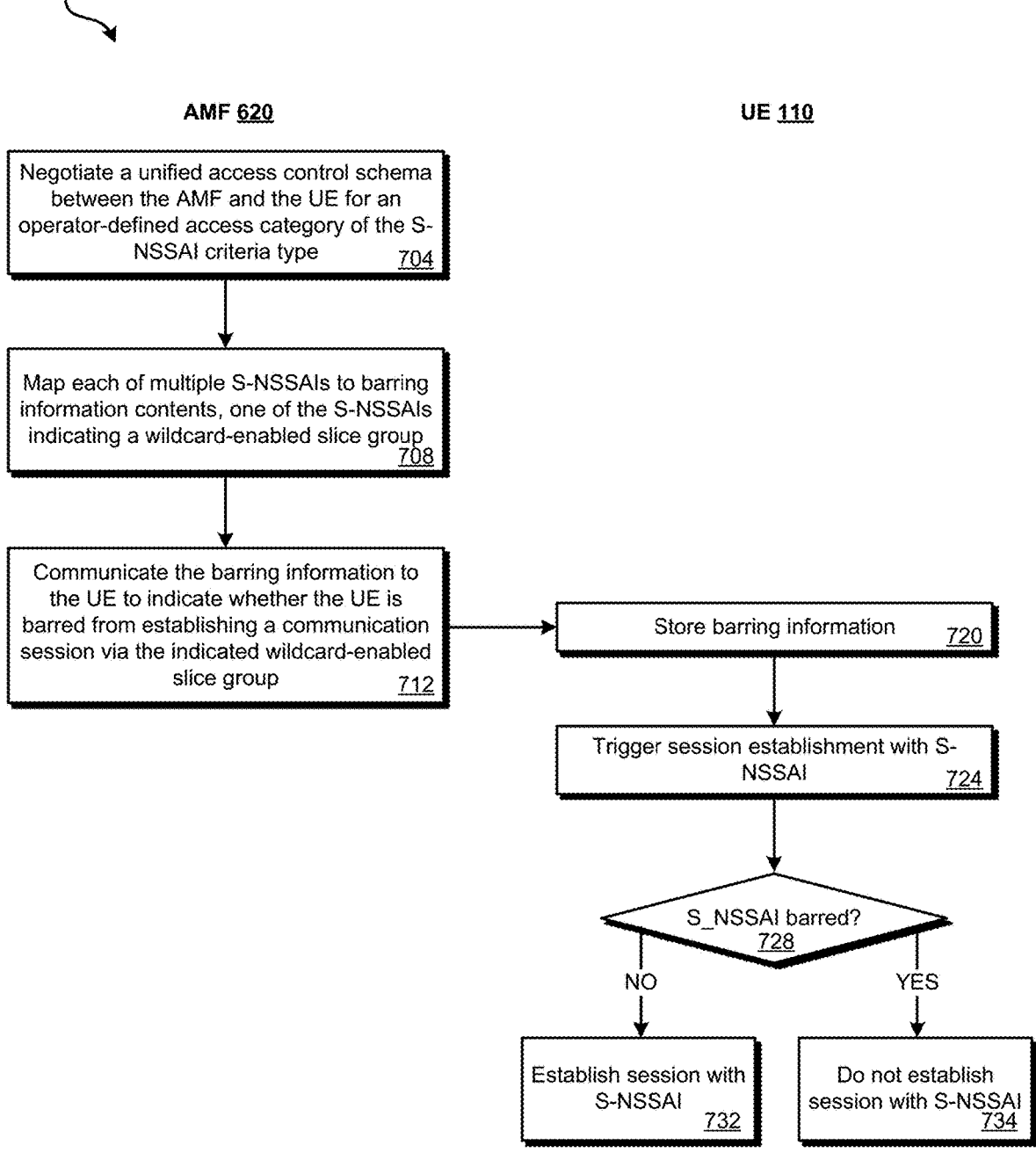

700

AMF 620

Negotiate a unified access control schema between the AMF and the UE for an operator-defined access category of the S-NSSAI criteria type                    704

Map each of multiple S-NSSAIs to barring information contents, one of the S-NSSAIs indicating a wildcard-enabled slice group                    708

Communicate the barring information to the UE to indicate whether the UE is barred from establishing a communication session via the indicated wildcard-enabled slice group                    712

UE 110

Store barring information                    720

Trigger session establishment with S-NSSAI                    724

S_NSSAI barred?                    728

NO                              YES

Establish session with S-NSSAI                    732

Do not establish session with S-NSSAI                    734

FIG. 7

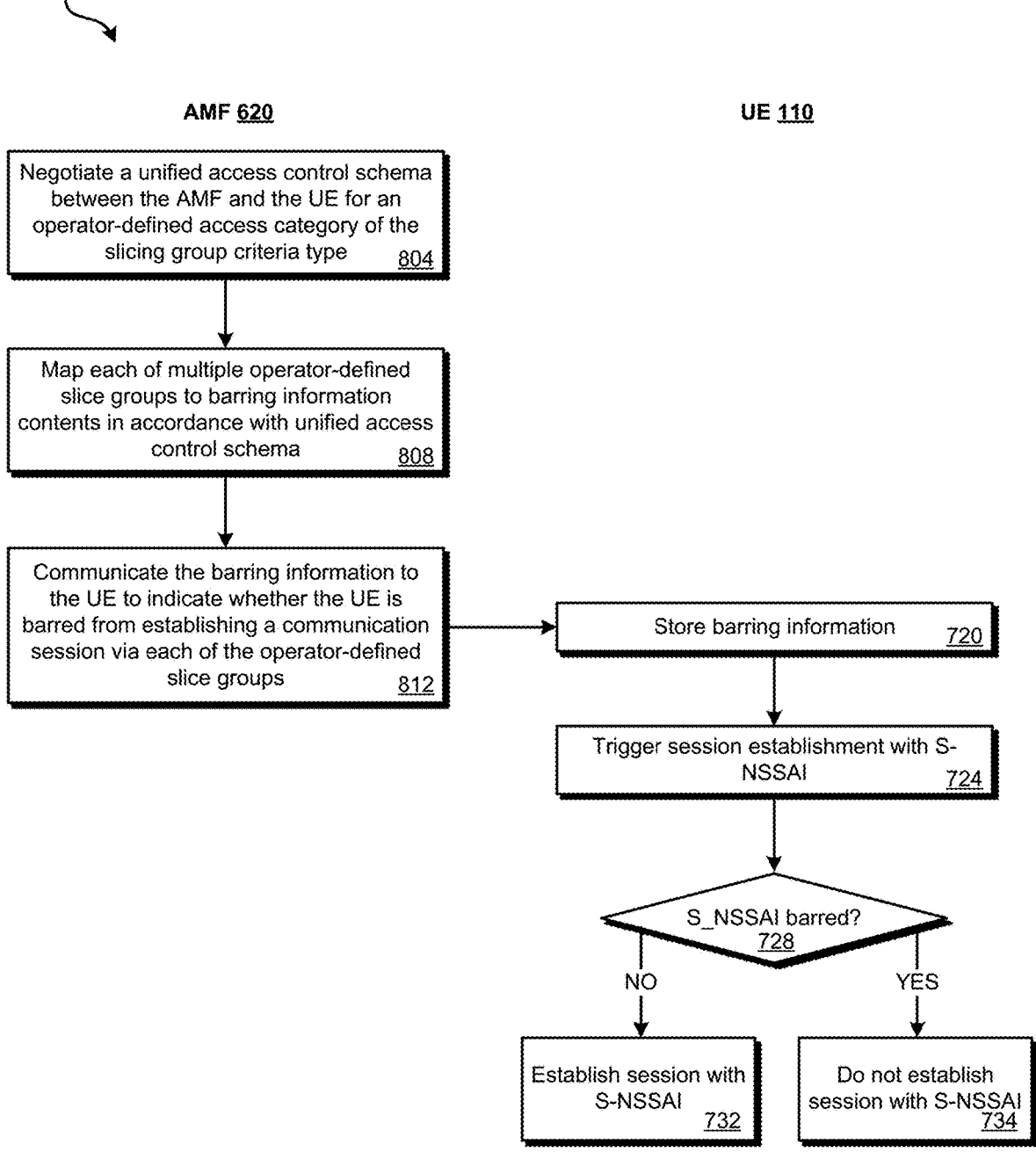

800

AMF 620

Negotiate a unified access control schema between the AMF and the UE for an operator-defined access category of the slicing group criteria type    804

Map each of multiple operator-defined slice groups to barring information contents in accordance with unified access control schema    808

Communicate the barring information to the UE to indicate whether the UE is barred from establishing a communication session via each of the operator-defined slice groups    812

UE 110

Store barring information    720

Trigger session establishment with S-NSSAI    724

S_NSSAI barred? 728

NO

YES

Establish session with S-NSSAI    732

Do not establish session with S-NSSAI    734

FIG. 8

UNIFIED ACCESS CONTROL WITH NETWORK SLICE GROUPING

FIELD

Embodiments relate generally to wireless communication networks, and, more particularly to group-level identification and exploitation of network slice groups.

BACKGROUND

Some modern wireless communication networks, such as fifth generation (5G) wireless networks, have begun to support so-called network slicing. The communication network includes physical (e.g., multi-domain) infrastructure, such as transport network infrastructure, core network infrastructure, and access network infrastructure. Virtual network operators (VNOs), also referred to as mobile network operators (MNOs), mobile virtual network operators (MVNOs), and the like can concurrently use the physical infrastructure to offer multiple virtualized networks.

Such network slices can be implemented using various virtualization technologies, such as software-defined networking (SDN) and network functions virtualization (NFV) (also referred to as virtualized network functions (VNFs). Each of those virtualized networks is considered to be a network slice, and each network slice can be designed (e.g., optimized) to support a particular desired set of users, applications, services, network functions, etc. Each network slice can be implemented with its own management domain and its own automation, and each network slice can be logically separated from other network slices. For example, different network slices can be used to separate and/or prioritize traffic, manage security, maintain separation between customers and/or services, etc.

While the concept of network slicing was originally to enable self-contained virtualized networks, some VNOs have more recently found use cases for grouping network slices. For example, a VNO may offer multiple network slice types (e.g., optimized for particular categories of services) to each of multiple customers. When a particular user equipment (UE) device sends an attachment request to connect with the wireless network via an eNodeB, or other suitable network node, the VNO may attach the UE to the network concurrently via multiple network slices by associating the UE's communications with an explicit list of the identifier of each network slice that is part of the group. Particularly in cases where it is desirable to attach the UE to a large number of network slices, such as to all networks slices for a particular customer, such explicit listing of network slice identifiers can be inefficient.

SUMMARY

Embodiments provide novel approaches to handling network slice groups in access stratum and non-access stratum communications in a cellular communication network. Novel slice identification schema can support group-level identification of groups of network slices without individually listing the network slices. Some embodiments implement a slice identifier that supports wildcard slice/service type (SST) options and/or wildcard slice differentiator (SD) options to support wildcard-enabled slice groups. Some embodiments enable use of such wildcard-enabled slice groups in context of unified access control. Some embodiments introduce a novel criteria type to unified access control to expressly support flexible slice grouping.

According to one set of embodiments, a method is provided for network slice grouping in a cellular communication network infrastructure. The method includes: receiving a user equipment device (UE) message by one or more network function (NF) nodes of the cellular communication network infrastructure, the UE message being received from a UE of a plurality of UE devices via a radio access network (RAN); determining, by the at least one NF nodes, that the UE message invokes a wildcard-enabled slice group that is subset of a plurality of network slices, each network slice being a respective one of a plurality of virtualized data subnetworks, each virtualized data subnetwork uniquely identifiable by a respective one of a plurality of network slice identifiers, each network slice identifier having a respective unique combination of a slice/service type (SST) value and a slice differentiator (SD) value; generating, by the at least one NF nodes in response to the UE message, a NF message that identifies the wildcard-enabled slice group uniquely by one of the plurality of network slice identifiers that has either the SST value set to a predefined wildcard SST value or has the SD value set to a predefined wildcard SD value; and communicating the NF message to the UE via the RAN.

According to another set of embodiments, a system is provided for network slice grouping in a cellular communication network infrastructure. The system includes: a plurality of virtualized data subnetworks built on the cellular communication network infrastructure, each virtualized data subnetwork uniquely being one of a plurality of network slices identifiable by a respective one of a plurality of network slice identifiers, each network slice identifier having a respective unique combination of a slice/service type (SST) value and a slice differentiator (SD) value; and one or more network function (NF) nodes in communication with the plurality of virtualized data subnetworks and in communication with a plurality of user equipment devices (UEs) via one or more radio access networks (RANs). The one or more NF nodes include: one or more processors; and non-transitory memory having instructions stored thereon, which, when executed, cause the one or more processors to perform steps. The steps include: receiving a UE message from a UE of the plurality of UE devices via a RAN of the one or more RANs; determining that the UE message invokes a wildcard-enabled slice group that is subset of a plurality of network slices and is uniquely identifiable by one of the plurality of network slice identifiers that has either the SST value set to a predefined wildcard SST value or has the SD value set to a predefined wildcard SD value; and communicating, to the UE via the RAN, in response to the UE message, a NF message that includes the one of the plurality of network slice identifiers to uniquely identify the wildcard-enabled slice group.

According to another set of embodiments, a method is provided for unified access control of network slice groups in a cellular communication network infrastructure. The method includes: negotiating, between an access and mobility management function (AMF) and a user equipment device (UE) via a radio access network (RAN), a unified access control schema corresponding to an operator-defined access category that indicates a criteria type configured to support slice grouping; mapping a slice group identifier to a corresponding value field of a barring information message in accordance with the unified access control schema, the slice group identifier uniquely identifying an operator-defined group of network slices of a plurality of network slices, each of the plurality of network slices being uniquely identifiable by a network slice identifier separate from the slice group identifier; and communicating the barring information message from the AMF to the UE via the RAN to indicate to the UE which of the plurality of network slices is barred from use in establishing communication sessions between the UE and the cellular communication network infrastructure.

According to another set of embodiments, another method is provided for unified access control of network slice groups in a cellular communication network infrastructure. The method includes: receiving, by a user equipment device (UE) from an access and mobility management function (AMF) via a radio access network (RAN), a barring information message indicating to the UE which of a plurality of network slices is barred from use in establishing communication sessions between the UE and the cellular communication network infrastructure, the barring information message uniquely identifying at least one operator-defined group of network slices of the plurality of network slices by a slice group identifier mapped to a corresponding value field of the barring information message in accordance with a previously negotiated unified access control schema, the unified access control schema corresponding to an operator-defined access category that indicates a criteria type configured to support slice grouping; triggering, by the UE, establishment of a communication session between the UE and the cellular communication network infrastructure, the triggering invoking at least one network slice of the at least one operator-defined group of network slices; determining, by the UE based on the barring information message, whether the at least one network slice is barred from use in establishing communication sessions between the UE and the cellular communication network infrastructure; and establishing a communication session by the UE with the cellular communication network infrastructure via a virtualized data network defined by the at least one network slice responsive only to the determining that the at least one network slice is not barred from use in establishing communication sessions between the UE and the cellular communication network infrastructure.

According to another set of embodiments, a system is provided for unified access control of network slice groups in a cellular communication network infrastructure. The system includes: a plurality of virtualized data subnetworks built on the cellular communication network infrastructure, each virtualized data subnetwork uniquely being one of a plurality of network slices identifiable by a respective one of a plurality of network slice identifiers; and an access and mobility management function (AMF) node in communication with the plurality of virtualized data subnetworks and in communication with a plurality of user equipment devices (UEs) via one or more radio access networks (RANs). The AMF node includes: one or more processors; and non-transitory memory having instructions stored thereon, which, when executed, cause the one or more processors to perform steps. The steps include: negotiating a unified access control schema corresponding to an operator-defined access category that indicates a criteria type configured to support slice grouping; mapping a slice group identifier to a corresponding value field of a barring information message in accordance with the unified access control schema, the slice group identifier uniquely identifying an operator-defined group of network slices of the plurality of network slices; and communicating the barring information message to at least one of the plurality of UEs via the RAN to indicate which of the plurality of network slices is barred from use in establishing communication sessions between the at least one of the plurality of UEs and the cellular communication network infrastructure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 4A and 4B show an example of a novel schema for network slice identification that provides efficient slice grouping along the SST dimension and/or along the SD dimension, according to embodiments described herein;

FIG. 7 shows a flow diagram of a method to implement a first novel approach to unified access control over network slice groups, according to some embodiments described herein; and FIG. 8 shows a flow diagram of a method to implement a second novel approach to unified access control over network slice groups, according to some embodiments described herein.

Figure 1:
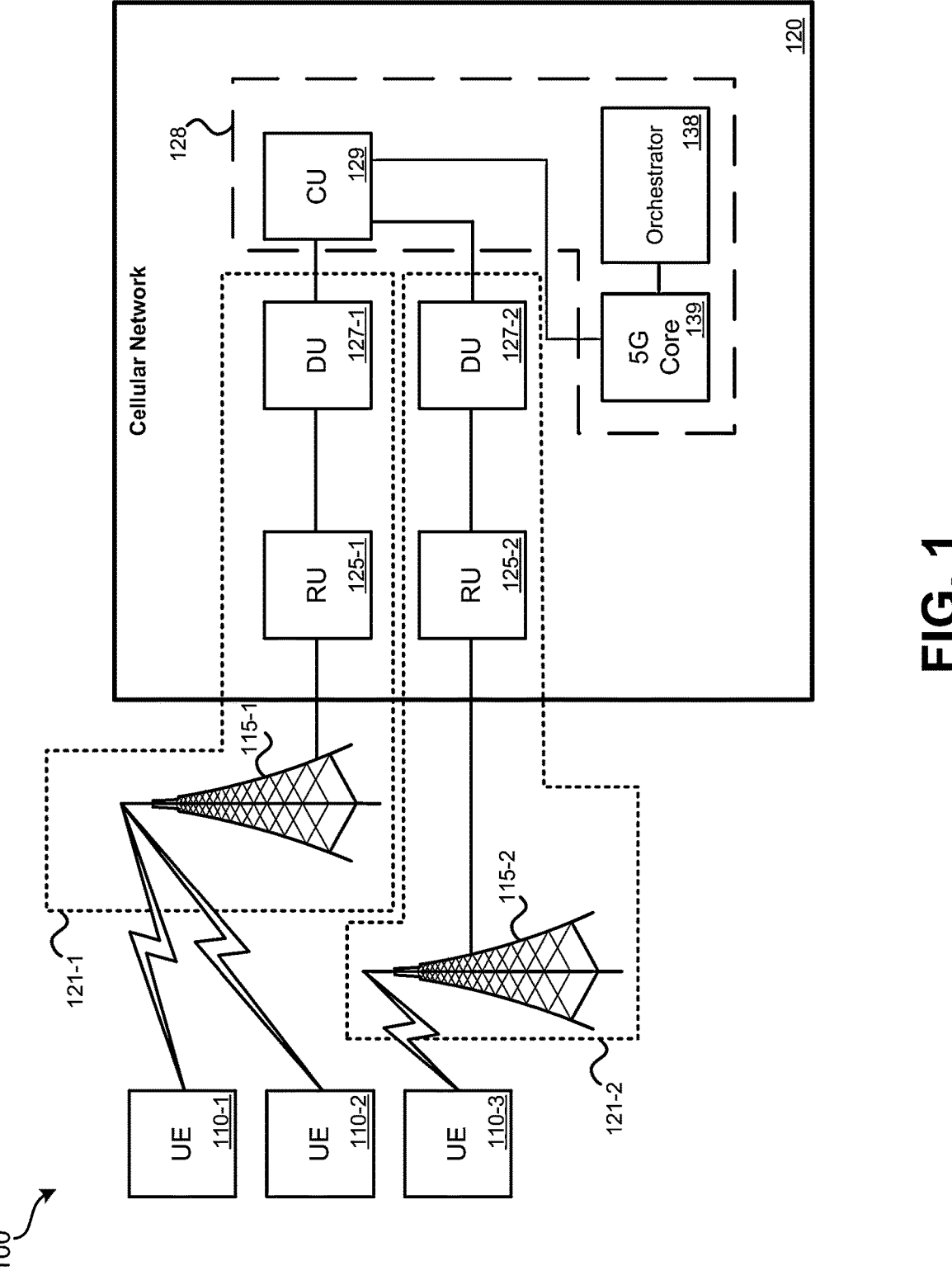
FIG. 1 illustrates an embodiment of a cellular network system as context for various embodiments described herein.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Some modern wireless communication networks, such as fifth generation (5G) wireless networks, have begun to support so-called network slicing. The communication network includes physical (e.g., multi-domain) infrastructure, such as transport network infrastructure, core network infrastructure, and access network infrastructure. Virtual network operators (VNOs), also referred to as mobile network operators (MNOs), mobile virtual network operators (MVNOs), and the like can concurrently use the physical infrastructure to offer multiple virtualized networks. Such network slices can be implemented using various virtualization technologies, such as software-defined networking (SDN) and network functions virtualization (NFV) (also referred to as virtualized network functions (VNFs). Each of those virtualized networks is considered to be a network slice, and each network slice can be designed (e.g., optimized) to support a particular desired set of users, applications, services, network functions, etc. Each network slice can be implemented with its own management domain and its own automation, and each network slice can be logically separated from other network slices. For example, different network slices can be used to separate and/or prioritize traffic, manage security, maintain separation between customers and/or services, etc.

While the concept of network slicing was originally to enable self-contained virtualized networks, some VNOs have more recently found use cases for grouping network slices. For example, a VNO may offer multiple network slice types (e.g., optimized for particular categories of services) to each of multiple customers. When a particular user equipment (UE) device sends an attachment request to connect with the wireless network via an eNodeB, or other suitable network node, the VNO may attach the UE to the network concurrently via multiple network slices by associating the UE's communications with an explicit list of the identifier of each network slice that is part of the group. Particularly in cases where it is desirable to attach the UE to a large number of network slices, such as to all networks slices for a particular customer, such explicit listing of network slice identifiers can be inefficient.

Embodiments described herein provide a novel slice identification schema that supports group-level identification of groups of network slices without individually listing slices in access-stratum and/or non-access stratum communications. In some implementations, network slices can be uniquely identified by a slice identifier that includes a slice/service type (SST) portion and a slice differentiator (SD) portion. As described herein, such a slice identifier can be configured to support one or more wildcard SST options and/or wildcard SD options to support wildcard-enabled slice groups. For example, setting the SST portion to the wildcard SST option can uniquely identify a slice group that includes all SSTs for a particular SD designated in the SD portion; and/or setting the SD portion to the wildcard SD option can uniquely identify a slice group that includes all SDs for a particular SST designated in the SST portion. Some embodiments enable use of such wildcard-enabled slice groups in context of unified access control. Some embodiments introduce a novel criteria type to unified access control to expressly support flexible slice grouping.

For the sake of context, some embodiments are described herein with reference to various networking standards. In general, reference herein to a networking standard beginning with "TS" is intended to refer to a technical specification released by the 3rd Generation Partnership Project (3GPP) in connection with fifth generation (5G) cellular networks. However, such 5G-specific references are intended only to provide illustrative implementations for those contexts and are not intended to limit the application of embodiments described herein to other contexts. For example, innovative embodiments described herein can be applied beyond 5G networks, such as to any suitable previous and future generations and types of cellular and other wireless communication networks.

FIG. 1 illustrates an embodiment of a cellular network system 100 ("system 100") as context for various embodiments described herein. System 100 can include a 5G New Radio (NR) cellular network; other types of cellular networks, such as 6G, 76, etc. may also be possible. System 100 can include: user equipment (UE) 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations are illustrated: base station 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Figure 2:
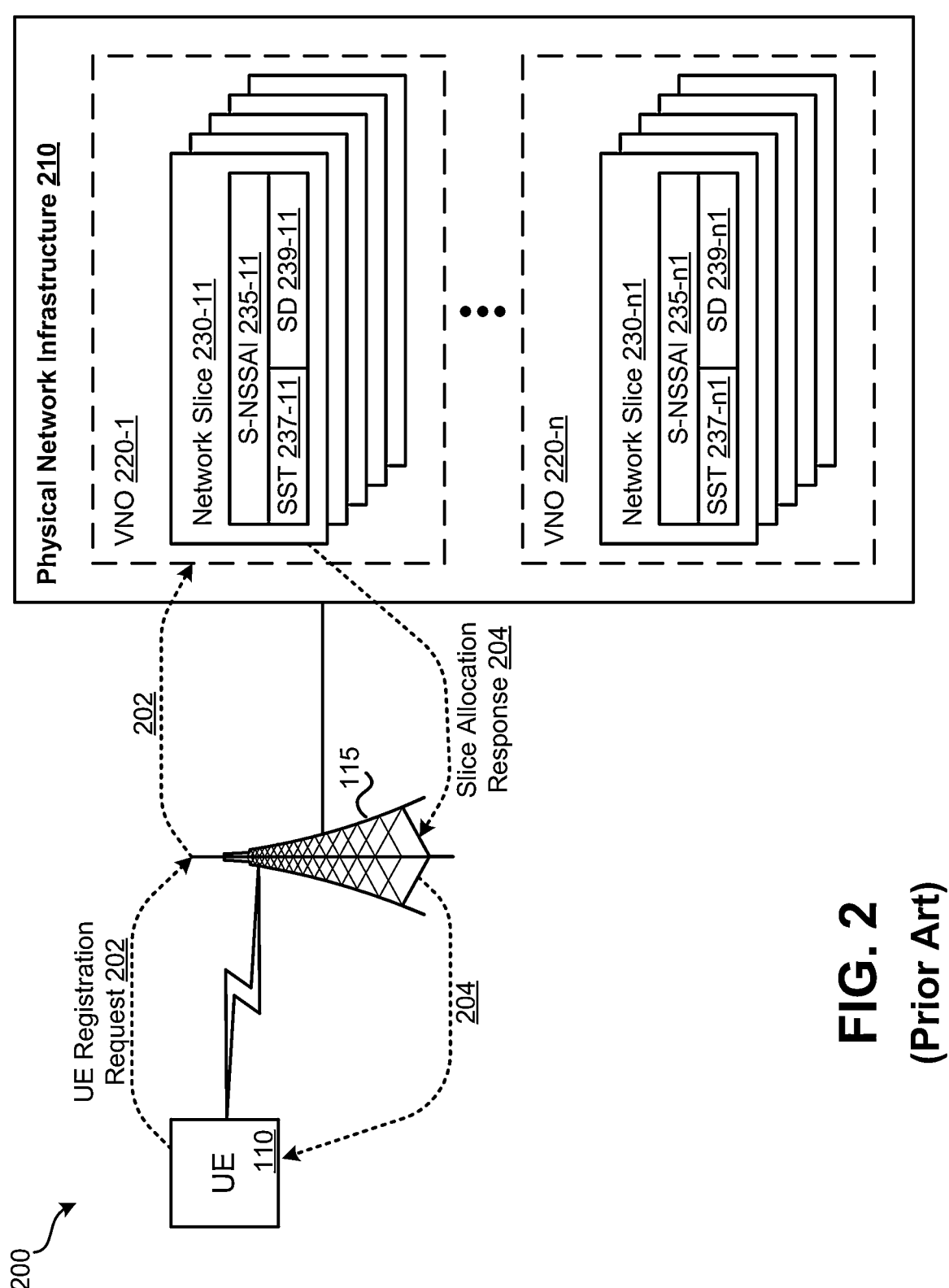
FIG. 2 shows a view of a conventional embodiment of a cellular communication network.

FIG. 2 shows a view of a conventional embodiment of a cellular communication network 200. For the sake of simplicity, the conventional network 200 is shown with a single UE 110 in communication with the network infrastructure via a single tower 115. The tower 115 can generally represent a radio access network (RAN), such as an eNodeB, or the like. The network infrastructure is illustrated generally as a physical infrastructure 210 having subnetworks associated with virtual network operators (VNOs) 220. As described herein, each VNO 220 can implement multiple (e.g., a large number of) network slices 230, each supporting a stand-alone virtual network with its own network management, orchestration, etc. that is optimized or otherwise configured for supporting particular applications, providing particular services, etc.

UEs 110 can receive tailored communication services via the RAN and the network slices 230, but the UEs 110 and the RAN are not considered part of any network slices 230. Further, depending on the physical and logical architecture, certain network functions of the network infrastructure can be common to the network slices 230, while other network functions can be dedicated to particular network slices 230. As one example, the network infrastructure can include a number of common network functions, such as a network slice selection function (NSSF) and a network repository function (NRF). The example network infrastructure also includes a number of slice-specific functions, such as each network slice 230 having its own instance of a session management function (SMF) to provide the slice with management functions, and its own instance of a user plane function (UPF) to provide a respective tailored data network via the network slice 230. Some network functions can be common from the UE 110 side, but slice-specific from the network side, or vice versa. For example, the example network infrastructure may dedicate different instances of an access and mobility management function (AMF) to different network slices 230, but the AMF may be a common node from the perspective of any particular UE 110.

According to some network standards, the behavior of a network slice 230 is realized by a network slice instance (NSI), which is an activated network slice. Each NSI can include one or more network slice subnet instances (NSSIs), such as one or more core network NSSIs and one or more access network NSSIs. Each network slice can be uniquely identified. In the illustrated conventional network 200, each network slice is uniquely identified by a single-network slice selection assistance information (S-NSSAI) identifier 235. The S-NSSAI 235 includes two portions: a slice/service type (SST) portion 237 and a slice differentiator (SD) portion 239. Example schemas for defining network slice identifiers in context of 5G networks are discussed in TS 23.501 as promulgated by 3GPP.

Each VNO 220 can offer a collection of network services defined by a public land mobile network (PLMN). According to the PLMN, each UE 110 can be provisioned with a "configured NSSAI," which can correspond to a collection of S-NSSAIs 235. When a UE 110 desires to establish a communication session over the illustrated conventional network 200, the UE 110 can derive a "requested" NSSAI from its configured NSSAI. The UE 110 can send a UE registration request message 202 to the RAN (e.g., to cell tower 115), identifying the requested NSSAI. The RAN can be aware of which AMFs support which network slices 230, and the RAN can select an appropriate AMF to support the requested NSSAI, accordingly. The AMF can derive an "allowed" NSSAI (e.g., and a "rejected" NSSAI) on its own, or in conjunction with the NSSF. Information about the allowed and rejected NSSAIs is sent back to the UE 110. The UE 110 can then request and establish one or more PDU sessions over one or more of the S-NSSAIs 235 of the allowed NSSAI.

As described herein, each network slice 230 can be configured by the VNO 220 to be tailored to a particular type of service, application, etc. For example, when the UE 110 requests to establish a PDU session for a particular application, the request can indicate a particular S-NSSAI 235 (of the allowed NSSAI) that is most suitable for, tailored for, or otherwise appropriate for that application. For example, each VNO 220 can create and manage a large number of network slices 230, each tailored for a particular service type (indicated by the SST portion 237 of the S-NSSAI 235) and for a particular tenant or type of tenant (indicated by the SD portion 239 of the S-NSSAI 235). The tenant or type of tenant can be a category of subscribers, an enterprise customer, etc.

Figure 3A:
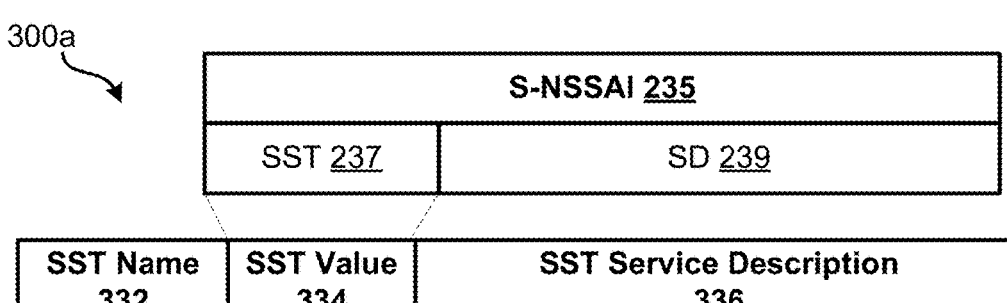
FIGS. 3A and 3B show an example of a conventional schema for a network slice identifier.
Figure 3B:
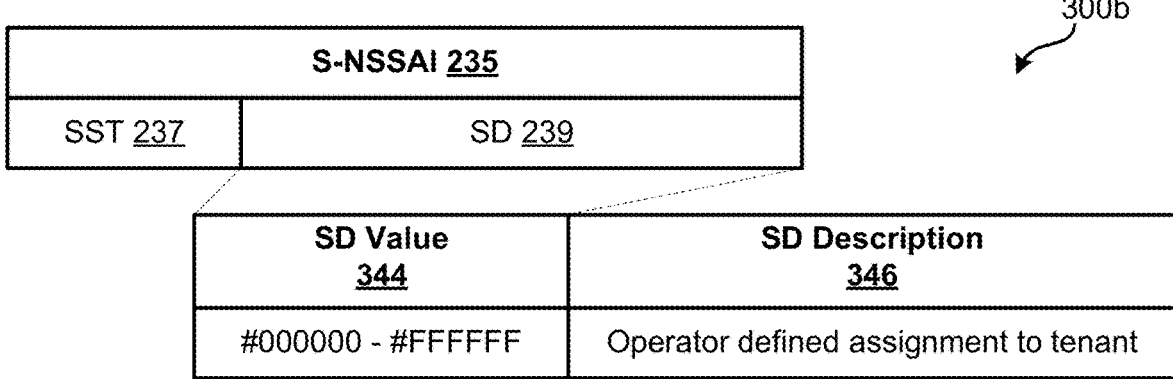

For added context, FIGS. 3A and 3B show an example of a conventional schema 300 for a S-NSSAI 235. Such a schema is defined in various wireless communication networking standards. As described above, the S-NSSAI 235 includes an SST portion 237 and an SD portion 239. Each SST portion 237 defines a category of service for which the network slice is being configured or optimized as corresponding to expected performance and behavior of the virtual network provided by the network slice 230. Each SD portion 239 provides optional differentiation between network slices 230 of the same SST, such as to allow segmentation between network slices 230 of the same SST being provided to different customers. According to some standards, the SST portion 237 is represented by one octet (an SST value 334), such that there can be up to 256 SST values 334 that can each have an associated SST name 332 and SST service description 336; and the SD portion 239 is represented by three octets (an SD value 344), such that there can be over 10 million SD values 334 that can each have an associated SD description 346. The range of values is indicated as between hexadecimal '#000000' (i.e., '0' decimal) and '#FFFFFF' (i.e., '16,777,215' decimal).

As shown in FIG. 3A, according to some wireless communication standards, there is a first set of SST values 334 (00000001' through '00000101' binary, or '1' through '5' decimal) that have defined SST names 332 and SST service descriptions 336. SST value 334 '1' corresponds to enhanced (or extreme) mobile broadband (eMBB) network slices 230, which can be optimized for broadband video applications, and/or other types of applications that tend to consume high amounts of network bandwidth. SST value 334 '2' corresponds to ultra-reliable low-latency communications (URLLC) network slices 230, which can be optimized for certain emergency applications, telemedicine applications, and/or other contexts that tend to require very high reliability and very low latency. SST value 334 '3' corresponds to massive Internet-of-things (MIoT) network slices 230 (also referred to as massive machine-type communications, MMTC), which can be optimized for IoT sensor devices and applications, and/or other context in which relatively large numbers of devices each tend to use relatively small amounts of network bandwidth and/or do not require high performance. SST value 334 '4' corresponds to vehicle-to-X (V2X) network slices 230, which can be optimized for applications and services to support autonomous vehicles, and/or the like. SST value 334 '5' corresponds to high-performance machine-type communications (HMTC) network slices 230, which can be optimized for IoT and/or other devices that tend to require high throughput and high reliability. A second set of SST values 334 (00000110' through '01111111' binary, or '6' through '127' decimal) is reserved for future definition by the standard. A third set of SST values 334 (10000000' through '11111111' binary, or '128' through '255' decimal) is allocated for definition by the VNO 220.

As shown in FIG. 3B, according to some wireless communication standards, all of the SD values 344 can be defined by the VNO 220. Each SD value 344 can be associated by the VNO 220 with a corresponding SD description 346. For example, the SD description 346 can indicate a particular tenant (e.g., enterprise subscriber, etc.), class of service, or any other suitable designation that differentiates the particular network slice 230 from another network slice 230 of the same SST. Suppose, for example, that a large VNO 220 has a number of subscribers, including a large vehicle company (Company A), a large retailer (Company B), and a large logistics company (Company C). The VNO 220 may decide to build out network services for each of these subscribers to include eMBB network slices 230 for all three companies, V2X network slices 230 for Company A and Company C, MIoT network slices 230 for Company B and Company C, etc. In such a case, the VNO 220 now has eMBB network slices 230 for three different customers, and the VNO 220 can use different SD values 344 to provide segmentation and differentiation between those network slices 230.

In some cases, it may be desirable to treat network slices 230 as a group with respect to either a common SST dimension or a common SD. As one illustration, a VNO 220 may desire to perform a slice orchestration or management function on a particular SST, such as by upgrading certain network functions for all subscribers that have been allocated network slices 230 of that particular SST. For example, the VNO 220 has multiple car companies as subscribers, and each car company is allocated at least one V2X network slice 230, differentiated by respective SD values 344. Performing a function to affect all network slices 230 of the same SST may involve repeating related messaging by the VNO 220 among components of the network for each of the effected network slices 230. For example, a particular message operates on a designated network slice 230 by indicating the corresponding S-NSSAI 235 of the network slice 230. If there are twenty network slices 230 of the same SST, each differentiated by a respective SD value 344, it may be necessary to repeat the message for each of the twenty differentiated network slices 230. As another illustration, a VNO 220 may desire to perform a slice orchestration or management function for a particular subscriber, such as by upgrading certain network functions for all network slices 230 associated with that subscriber's SD value 344. As in the previous illustration, performing a function to affect all network slices 230 of the same SD may involve repeating related messaging by the VNO 220 among components of the network for each of the effected network slices 230. For example, a particular message operates on a designated network slice 230 by indicating the corresponding S-NSSAI 235 of the network slice 230. If there are twenty network slices 230 of the same SD, each of a different respective SST value 334, it may be necessary to repeat the message for each of the twenty network slices 230.

Such repeated messaging can be inefficient and/or otherwise undesirable. FIGS. 4A and 4B show an example of a novel schema 400 for network slice identification that provides efficient slice grouping along the SST dimension and/or along the SD dimension, according to embodiments described herein. For ease of comparison, the novel slice identification schema 400 is shown in a similar manner to the conventional schema 300 of FIGS. 3A and 3B. In particular, the novel slice identification schema 400 is illustrated as backwards-compatible with the conventional schema 300 of the S-NSSAI 235.

FIG. 4A shows an illustrative listing of SST information, including SST values 334 with corresponding SST names 332 and SST service descriptions 336. Unlike in the conventional schema, the novel slice identification schema 400 includes at least one wildcard SST option 410. The wildcard SST option 410 is assigned to a particular SST value 334, illustrated as 'XXX' (with a corresponding SST name 332 and SST service description 336). In some implementations, the wildcard SST option 410 is assigned to SST value 334 '0' (i.e., '00000000' binary), which is unassigned in applicable standards as of this filing. In other implementations, the wildcard SST option 410 is assigned to any of the set of SST values 334 from '6' to '127', which are reserved for designation in the standard, but are as-yet unassigned (i.e., in the range of SST values 334 from '00000110' to '01111111' binary). Whether the wildcard SST option 410 is assigned to SST value 334 '0', or to any of the unassigned SST values 334 between '6' and '127', such implementations involve inclusion of the assignment in the relevant wireless communication standards. In other implementations, the wildcard SST option 410 is assigned to any of the set of SST values 334 from '128' to '255', which are reserved for designation by VNOs 220 without requiring acceptance by any standards organization (i.e., in the range of SST values 334 from '10000000' to '11111111' binary).

FIG. 4B shows an illustrative listing of SD information, including SD values 344 with corresponding SD descriptions 346. Unlike in the conventional schema, the novel slice identification schema 400 includes at least one wildcard SD option 420. The wildcard SD option 420 is assigned to a particular SD value 344, illustrated as '#XXXXXX' (with a corresponding SD description 346). As described above, current standards allocate all of the more than 10 million possible SD values 344 for designation by the VNOs 220 without requiring acceptance by any standards organization. Implementations can assign the wildcard SD option 420 to any of over 16 million SD values 344.

In some implementations, the wildcard SST option 410 indicates "all SSTs." When the S-NSSAI 235 has the SST portion 237 set to the wildcard SST option 410 and the SD portion 239 set to a particular SD value 344, the S-NSSAI 235 directly refers to a slice group that includes the network slices 230 for all SSTs for that particular SD. Similarly, in some implementations, the wildcard SD option 420 indicates "all SDs." When the S-NSSAI 235 has the SD portion 239 set to the wildcard SD option 420 and the SST portion 237 set to a particular SST value 334, the S-NSSAI 235 directly refers to a slice group that includes the network slices 230 for all SDs for that particular SST. Any type of network slice 230 grouping that is enabled by the described types of wildcard SST options 410 and/or wildcard SD options 420 can be referred to as a wildcard-enabled slice group.

While each of FIGS. 4A and 4B shows only a single respective wildcard option, other implementations can include other numbers of wildcard SST options 410 and/or wildcard SD options 420. For example, as noted above, some implementations use the set of SST values 334 reserved for VNO 220 designation (i.e., SST values 334 from '10000000' to '11111111' binary) for the wildcard SST option 410. In such an implementation, one or more subsets of those SST values 334 can be related for grouping purposes, and one of the SST values 334 in each subset can be used as the wildcard SST option 410 for that subset. For example, the VNO 220 can create a set of 15 network slices 230, all tailored for different types of network security approaches in the range of SST values 334 from '10010001' to '10011111' (binary), and SST value 334 '10010000' can be assigned as the wildcard SST option 410 for that subset; setting the SST value 334 to '10010000' directly indicates a slice group of the 15 network slices 230. Such an approach can be used to assign, for example, a first wildcard SST option 410 to group all SSTs (e.g., for a particular SD) and one or more additional wildcard SST options 410 to group subsets of SSTs. The same technique can be used to assign (e.g., in addition to, or instead of a wildcard SD option 410 to group all SDs) one or more wildcard SD options 420 to group subsets of SDs.

Figure 5:
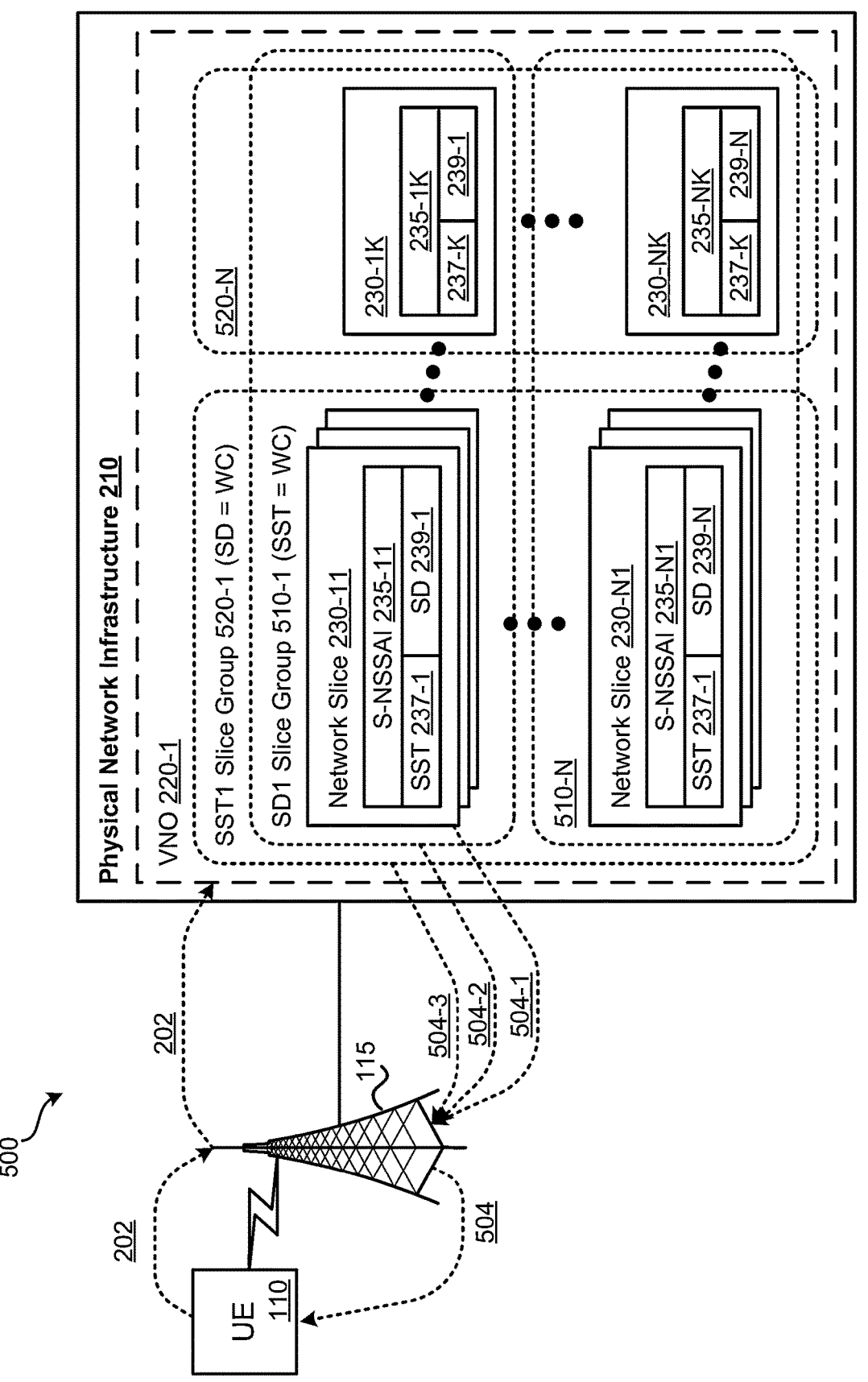
FIG. 5 shows an illustrative cellular communication network that supports wildcard-based slice grouping, according to various embodiments described herein.

FIG. 5 shows an illustrative cellular communication network 500 that supports wildcard-based slice grouping, according to various embodiments described herein. For the sake of simplicity, the network 500 is shown with a single UE 110 in communication with the network infrastructure via a single tower 115. The tower 115 can generally represent a radio access network (RAN), such as an eNodeB, or the like. The network infrastructure is illustrated generally as a physical infrastructure 210 having subnetworks associated with virtual network operators (VNOs) 220. Only a single VNO 220 is show, but the physical network infrastructure 210 can support any suitable number of VNOs 220. Each VNO 220 can implement multiple (e.g., a large number of) network slices 230, each supporting a stand-alone virtual network with its own network management, orchestration, etc. that is optimized or otherwise configured for supporting particular applications, providing particular services, etc. Additionally, as shown, wildcard SST options 410 and/or wildcard SD options 420 can be used to implement slice grouping for the network slices 230 of a VNO 220.

For example, each network slice 230 is uniquely identified by a unique slice identifier. The slice identifier can be implemented using any suitable schema that supports the types of wildcard SST options 410 and/or wildcard SD options 420 described herein. Some embodiments implement the unique slice identifiers as single-network slice selection assistance information (S-NSSAI) identifiers 235, each having an SST portion 237 and an SD portion 239. By using the types of wildcard SST options 410 and/or wildcard SD options 420 described herein, such communications can directly invoke a correspondingly defined group of network slices 230 (i.e., a wildcard-enabled slice group). As used herein, a network slice 230 is considered to be "invoked" by a communication when the communication includes an identification of the network slice 230 either directly, as part of a NSSAI, as part of a wildcard-enabled slice group, etc.

Several examples of such wildcard-enabled slice groups are shown. In the illustrated examples, the VNO 220 has created a large number of slices to support up to K SSTs for up to N SDs. For example, network slice 230-11 is tailored for the 1st SST for the 1st SD, and network slice 230-NK is tailored for the Kth SST for the Nth SD. The illustrated arrangement of network slices 230 is simplified in a number of ways to avoid over-complicating the figure. For example, the VNO 220 can typically provide network slices 230 of different sets of SSTs for different SDs. One illustrated example of wildcard-enabled slice groups are groupings in the SST dimension. For example, the "SST1 Slice Group" 520-1 indicates a grouping of all network slices 230 common to a first SST, regardless of the SD (i.e., for all SDs having such a network slice 230). In the S-NSSAI 235 for the SST1 Slice Group 520-1, the SST portion 237 indicates an SST value 334 of '1', and the SD portion 239 indicates an SD value 344 corresponding to the (e.g., or a) wildcard SD option 410. Another illustrated example of wildcard-enabled slice groups are groupings in the SD dimension. For example, the "SD1 Slice Group" 510-1 indicates a grouping of all network slices 230 common to a first SD, regardless of the SST. In the S-NSSAI 235 for the SD1 Slice Group 510-1, the SST portion 237 indicates an SST value 334 corresponding to the (e.g., or a) wildcard SST option 410, and the SD portion 239 indicates an SD value 344 of '1'.

At least some of the communications between UEs 110, RAN components (e.g., tower 115), physical network infrastructure 210, virtual network functions, etc. include explicit slide identification. For example, communications regarding registration of UEs and establishment of a communication session, communications regarding slice management, and other types of communications include identification of S-NSSAIs 235 to indicate which network slice 230 or network slices 230 are invoked by the communications. For the sake of illustration, the network 500 shows a representation of UE registration and response messaging. The UE 110 communicates a UE registration request message 202 to the RAN (e.g., to cell tower 115), which can pass along the message (e.g., with modification) to the network functions of the VNO 220. In response, a UE registration response message 504 is communicated to the UE 110 via the RAN to indicate at least one allowed NSSAI representing a set of S-NSSAIs 235. By optionally exploiting one or more wildcard SST options 410 and/or wildcard SD options 420, the set of S-NSSAIs 235 of the at least one allowed NSSAI can include S-NSSAIs 235 corresponding to individual network slices 230 (e.g., 504-1), S-NSSAIs 235 corresponding to wildcard-enabled slice groups that are SD slice groups 510 (e.g., 504-2), and/or S-NSSAIs 235 corresponding to wildcard-enabled slice groups that are SST slice groups 520 (e.g., 504-3).

Figure 6A:
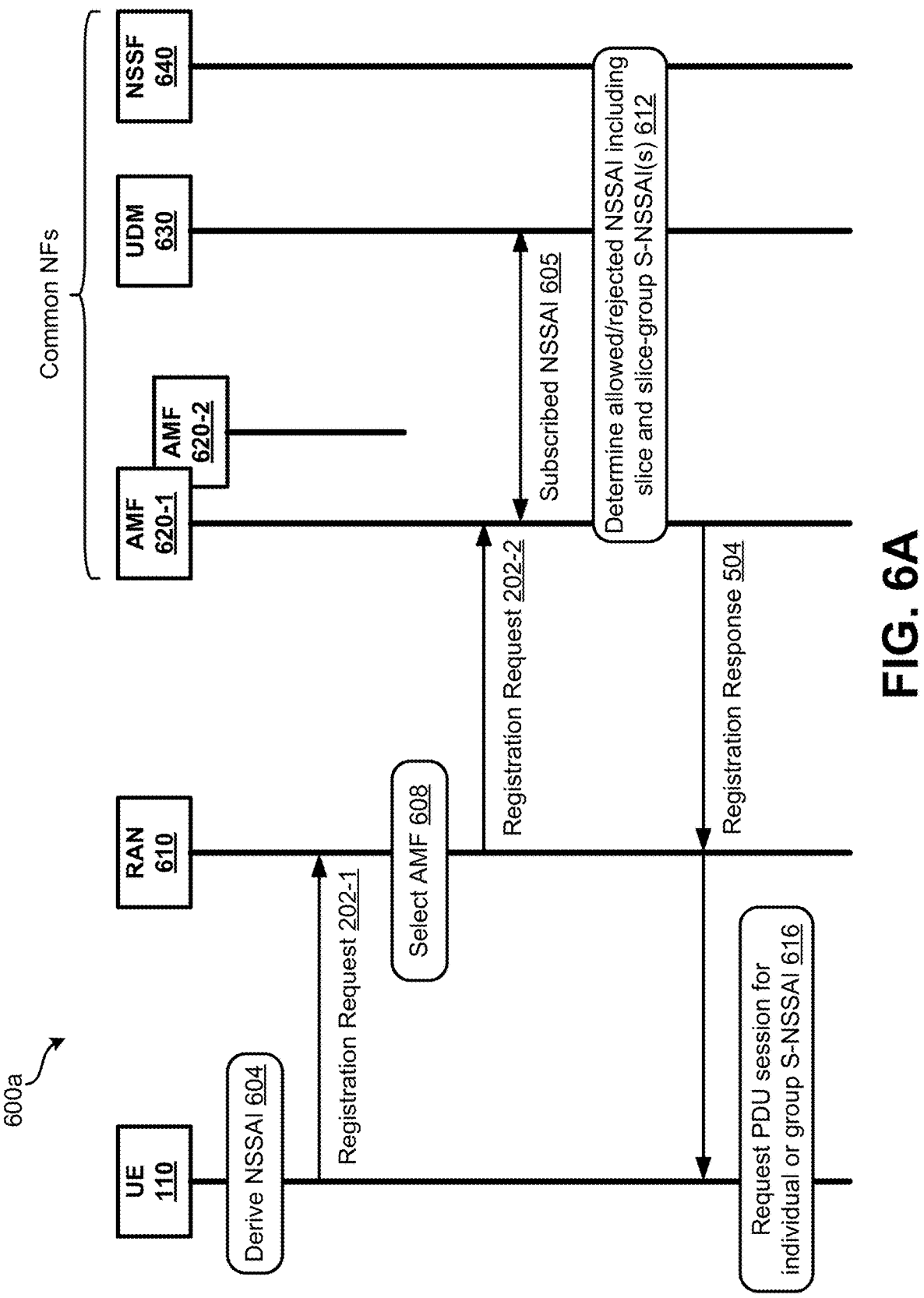
FIGS. 6A and 6B show illustrative flow diagrams for UE registration and subsequent establishment of one or more communication sessions on a cellular network that supports wildcard-enabled slice groups, according to various embodiments.
Figure 6B:
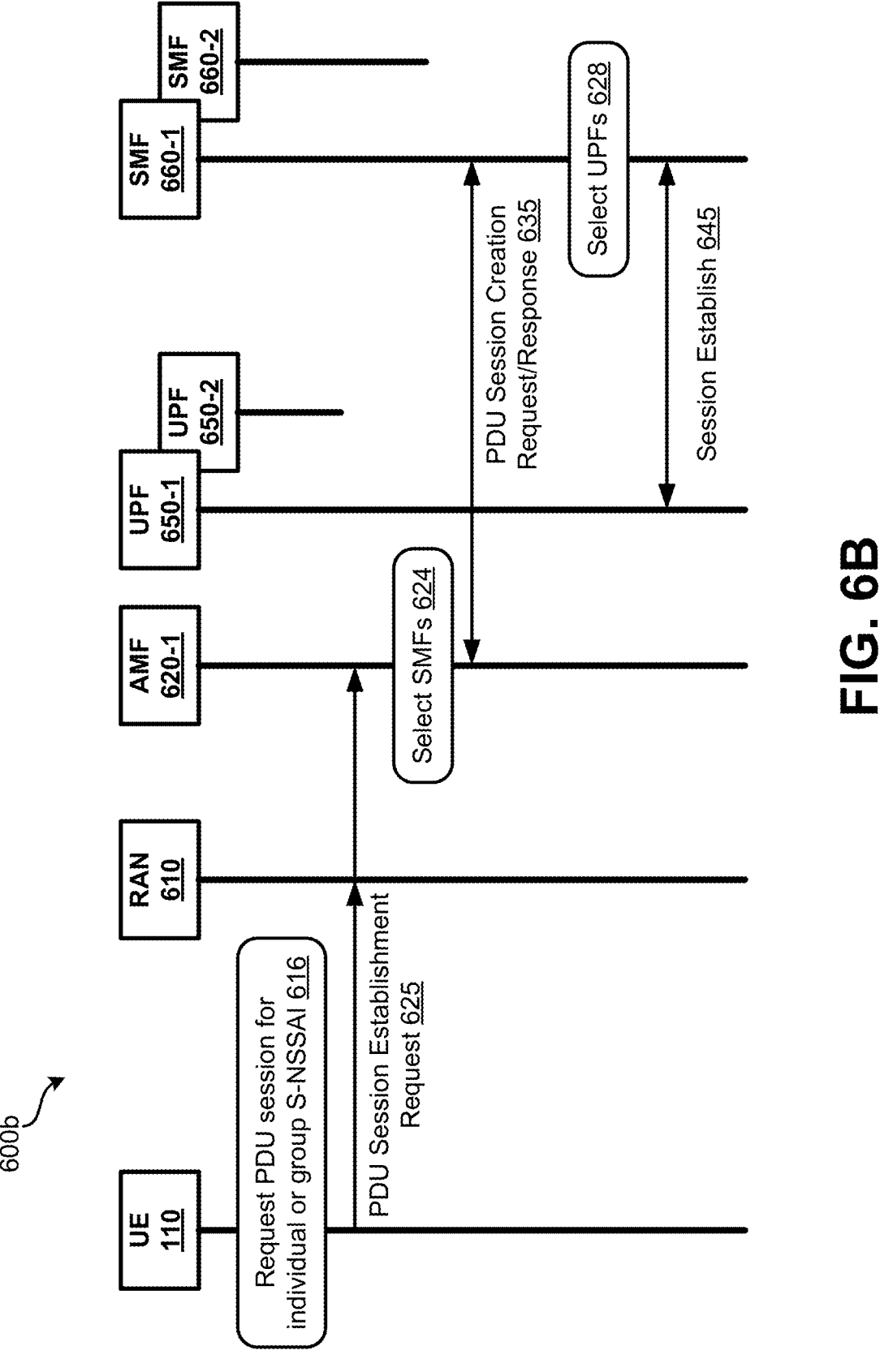

FIGS. 6A and 6B show illustrative flow diagrams 600 for UE registration and subsequent establishment of one or more communication sessions on a cellular network that supports wildcard-enabled slice groups, according to various embodiments. Turning first to FIG. 6A, a portion of the cellular network is shown to include a UE 110, a RAN 610, and common network functions (at least from the perspective of the UE 110). The common network functions can include at least one or more access and mobility management functions (AMFs) 620, a unified data management (UDM) function 630, and a network slice selection function (NSSF) 640.

Embodiments begin at stage 604 by the UE 110 deriving a "requested" NSSAI from its configured NSSAI. For example, each VNO 220 can offer a collection of network services defined by a public land mobile network (PLMN). According to the PLMN, each UE 110 can be provisioned with a "configured NSSAI," which can correspond to a collection of S-NSSAIs 235. The UE 110 can then derive its requested NSSAI from the configuration of the PLMN. The UE 110 can then send a UE registration request message 202-1 to the RAN 610. At stage 608, the RAN 610 can select an appropriate AMF 620. For example, the RAN 610 is aware of which network slices 230 are supported by each AMF 620 based on information exchanged during an "N2/ NG" setup procedure, or the like. Thus, the RAN 610 can select an appropriate AMF 620 based on the set of S-NSSAIs that correspond to the requested NSSAI and based on the RAN's 610 knowledge of which of those S-NSSAIs are supported by which AMF 620.

At stage 612, the AMF 620 can determine one or more "allowed" NSSAIs and/or one or more "rejected" NSSAIs. In some cases, the AMF 620 can make this determination on its own. In other cases, the AMF 620 makes this determination based on interrogating the NSSF 640. In some cases, the AMF 620 communicates and received subscription messages 605 with the UDM 630 to determine to which NSSAIs the UE 110 is subscribed. As described above, each allowed (and/or rejected) NSSAI includes a set of corresponding S-NSSAIs 235, and one or more of the S-NSSAIs 235 can identify a wildcard-enabled slice group. The AMF can communicate a UE registration response message 504 back to the UE 110 via the RAN 610. The UE registration response message 504 indicates the allowed and/or rejected NSSAIs. Based on the UE registration response message 504, at stage 616, the UE 110 can request establishment of a communication session via one or more network slices 230. For example, the UE 110 can request a so-called "PDU session," to provide end-to-end connectivity between the UE 110 and the specific data network or group of data networks that is implemented via the user plane function (UPF) or group of UPFs corresponding to a S-NSSAI 235 (e.g., representing a single network slice 230 or a wildcard-enabled slice group).

Turning to FIG. 6B, a different portion of the cellular network is shown to include the UE 110, the RAN 610, and the AMF 620 of FIG. 6A, as well as one or more UPFs 650 and one or more session management functions (SMF) 660. As noted above, at stage 616, the UE 110 can request establishment of a communication session via one or more network slices 230. Such a request can involve sending a session establishment request message 625 that indicates a specific S-NSSAI 235 over which to establish the session. For example, the UE 110, or a user of the UE 110, can start an application (e.g., a smartphone app) that can be mapped to a specific S-NSSAI 235 based on a UE route selection policy (URSP), or the like. The session establishment request message 625 can be communicated from the UE 110 via the RAN 610 to the AMF 620 previously determined by the RAN 610 to support the allowed NSSAI (that includes the S-NSSAI 235 being requested).

As noted above, a particular network slice 230 can effectively provide a stand-alone virtualized data network implemented generally by at least a UPF 650 and a SMF 660. At stage 624, the AMF 620 can select one or more SMFs 660 to support session management for the requested session. In cases where the S-NSSAI 235 indicates a wildcard-enabled slice group, more than one SMF 660 may be invoked. In some cases, the AMF 620 can directly select the appropriate one or more SMFs 660. If the AMF 620 is unable to autonomously select an appropriate one or more SMFs 660 (e.g., the AMF 620 is not aware of SMF information in the network), the AMF 620 can engage a network function (NF) discovery routine with a network repository function (NRF) and/or engage a slice selecting service of the NSSF 640.

Having selected one or more appropriate SMFs 660, the AMF 620 can communicate session creation request and response messages 635 with the selected SMF(s) 660. At stage 628, the SMF(s) 660 can select one or more appropriate UPFs 650 with which to establish the requested session based on the requested S-NSSAI 235. The SMF(s) 660 and UPF(s) 650 can exchange session establishment messages 645 by which to establish the requested session for the UE 110. According to some network configurations, the UPF(s) 650 are not directly aware of the network slices 230, such that the session establishment messages 645 do not explicitly indicate S-NSSAIs 235. Instead, the SMF(s) 660 signals one or more network instances to the UPF(s) 650 via the session establishment messages 645, and the UPF(s) 650 distinguish the domains of the network slices 230 based on the communicated network instances.

While certain descriptions above focus on certain types of messaging that explicitly identify an S-NNSAI 235, other embodiments relate to adaptations of so-called "unified access control" to allow for slice grouping. In general, unified access control allows the VNOs 220 to control network access, such as to determine which access attempts to allow or block in response to network congestion. Typically, such unified access control is based on so-called "access identities" and "access categories." VNOs 220 can broadcast barring information that identifies lists of barring parameters associated with access identities and access categories. When a UE 110 desires to access the network, the access attempt can have a corresponding one or more access identities and an access category, and the UE 110 can determine whether it is allowed to make the access attempt based on comparing the corresponding access identity and access category to the previously broadcast barring information. As such, the unified access control allows a VNO 220 to permit or bar network access by any UE 110. Some access identities and access categories can be defined by applicable network standards, and other can be reserved for definition and assignment by the VNOs 220. VNO-defined unified access control parameters (e.g., VNO-defined access categories) can be specified in the serving PLMN.

FIGS. 7 and 8 shows illustrative flow diagrams for methods 700 and 800, respectively, of performing unified access control with slice groups, according to various embodiments. The methods 700 and 800 can be implemented in any suitable communication network, such as those described above. For the sake of illustration, it is assumed that the methods 700 and 800 involve non-access stratum (NAS) communications in a cellular network, such as between a UE 110 and an AMF 620. In such contexts, the AMF 620 can communicate unified access control messaging 705 to the UE 110, such as by broadcasting barring information that indicates access identities and/or access categories that are barred from access to the network. Conventional network standards presently include an access category to permit unified access control at the network slice 230 level, but there is no support for unified access control at a slice group level. For example, Table 9.11.3.38.1 of TS 23.501, as promulgated by 3GPP, describes a number of criteria types that can be used in operator-defined access categories.

Among the standard-defined criteria types is a "S-NSSAI Type." This criteria type is defined to allows the VNO 220 to use unified access control to bar an individual S-NSSAI 235, or a list of individual S-NSSAIs 235. For example, each time the AMF 620 communicates barring information to bar access to multiple network slices, the AMF 620 the barring information includes a list of the individual S-NSSAIs 235 for those network slices. Such an approach can permit the VNO 220 to flexibly define any list of network slices. However, including a list of all barred and non-barred S-NSSAIs in all relevant NAS messaging can also be inefficient.

Embodiments described herein provide two novel approaches to unified access control of network slice groups in a cellular communication network infrastructure. Both approaches generally begin by negotiating (e.g., between an access and mobility management function (AMF) and a user equipment device (UE) via a radio access network (RAN)) a unified access control schema corresponding to an operator-defined access category that indicates a criteria type configured to support slice grouping. The approaches can then map a slice group identifier to a corresponding value field of a barring information message in accordance with the unified access control schema, the slice group identifier uniquely identifying an operator-defined group of network slices of a plurality of network slices, each of the plurality of network slices being uniquely identifiable by a network slice identifier separate from the slice group identifier. The approaches can then communicate the barring information message from the AMF to the UE via the RAN to indicate to the UE which of the plurality of network slices is barred from use in establishing communication sessions between the UE and the cellular communication network infrastructure.

According to both approaches, the UE ultimately receives the barring information message (e.g., and locally stores barring information encoded therein) indicating to the UE which of a plurality of network slices is barred from use in establishing communication sessions between the UE and the cellular communication network infrastructure. As some subsequent time, the UE trigger establishment of a communication session between the UE and the cellular communication network infrastructure, and the triggering can invoke at least one network slice of the at least one operator-defined group of network slices. The UE can determine, based on the barring information message, whether the at least one network slice is barred from use in establishing communication sessions between the UE and the cellular communication network infrastructure. The UE can then establish a communication session with the cellular communication network infrastructure (via a virtualized data network defined by the at least one network slice responsive) only after determining that the invoked network slice is not barred in the barring information.

FIG. 7 shows a flow diagram of a method 700 to implement a first novel approach to unified access control over network slice groups, according to some embodiments described herein. Such an approach uses an S-NSSAI criteria type as part of a VNO-defined access category with its contents (e.g., value fields) configured to support wildcard-enabled slice groups. Embodiments of the method 700 can begin at stage 704 by negotiating a unified access control schema of the S-NSSAI type. Such a negotiation can be performed, for example, between the AMF 620 and one or more UEs 110 during UE 110 registration with the network, or at any other suitable time. The negotiation can define a schema by which to indicate those of the network slices that are barred and those that are allowed. In general, the schema can define value fields that can be evaluated (e.g., interpreted) by a receiving UE 110 once the UE 110 is made aware of the schema. For example, the schema can define the manner in which S-NSSAIs 235 are indicated (e.g., in which octet, in which bit positions, in what format, in which order, how many bits per S-NSSAI, etc.) and the manner of indicating whether a particular S-NSSAI is barred (e.g., a bit value of '1' can indicate that a particular S-NSSAI 235 mapped to that bit position is barred from access by an associated UE 110).

At stage 708, embodiments can map each of multiple S-NSSAIs to corresponding value fields of barring information in accordance with the schema, where at least one of the mapped S-NSSAIs uniquely identifies a wildcard-enabled slice group. For example, the AMF 620 can inform the UE 110 of a mapping between a number of S-NSSAIs 235 and some number of bits. Subsequently, the AMF 620 can broadcast barring information by setting some of the bits to '1' and other bits to '0' (e.g., '1' indicates that UE 110 is barred from accessing the S-NSSAI 235 mapped to that bit, and '0' indicates that the UE 110 is allowed access to the S-NSSAI 235 mapped to that bit; or vice versa). In this way, any device that is not registered with the AMF 620 may be able to pick up the broadcast barring information, but will be unable to interpret the information without the schema received during the registration.

In the mapping of stage 708, one or more of the S-NSSAIs 235 that is mapped to bits (or otherwise to value fields) by the AMF 620 includes one or more wildcard SST options 410 and/or wildcard SD options 420 to indicate one or more SST slice groups 520 and/or SD slice groups 510. At stage 712, embodiments can communicate the barring information to the UE 110 to indicate whether the UE 110 is barred from establishing a communication session via the indicated wildcard-enabled slice group. For example, the AMF 620 broadcasts the barring information to a UE 110 including setting the one or more bits corresponding to the wildcard-enabled slice group to a barring state (e.g., to a '1' or '0' to indicate that the corresponding S-NSSAI 235 is barred). Doing so bars the entire wildcard-enabled slice group (i.e., the SST slice group 520 or SD slice group 510) uniquely defined by the S-NSSAI 235 without explicitly listing all network slices that are members of the group.

At stage 720, embodiments of the UE 110 can receive and locally store the barring information. At some subsequent time, at stage 724, the UE 110 can trigger a session establishment routine for establishing a PDU session, or other suitable communication session, between the UE 110 and the network using the network slice identified by a particular S-NSSAI 235. As part of the routine, at stage 728, the UE 110 can determine whether the requested S-NSSAI 235 is barred according to the barring information received and stored at stage 720. If the S-NSSAI 235 is not barred, a session can be established via the requested S-NSSAI 235 (stage 732). If the S-NSSAI 235 is barred, a session cannot be established via the requested S-NSSAI 235 (stage 734).

FIG. 8 shows a flow diagram of a method 800 to implement a second novel approach to unified access control over network slice groups, according to some embodiments described herein. Such an approach uses a novel "slice group criteria type" as part of a VNO-defined access category with its contents (e.g., value fields) configured to support VNO-defined slice groups. For example, according to Table 9.11.3.38.1 of TS 23.501, the S-NSSAI criteria type in invoked by setting the eighth octet of the VNO-defined access category definition to '00000010'. The criteria type octet can be followed by one or more S-NSSAI length-value value fields. For example, each value field can include one octet to indicate the length (in octets) of a following S-NS-SAI value field, followed by the number of octets of the N-NSSAI value field to identify the S-NSSAI (e.g., one octet for the SST value and three octets for the SD value, as described above).

Embodiments of the method 800 can begin at stage 804 by negotiating a unified access control schema of the slice group criteria type. Such a negotiation can be performed, for example, between the AMF 620 and one or more UEs 110 during UE 110 registration with the network, or at any other suitable time. The negotiation can define a schema by which to define VNO-defined slice groups (i.e., at least to identify which network slices are part of any particular VNO-defined slice group) and by which to indicate which of the VNO-defined slice groups are barred or allowed. In general, the schema can define value fields that can be evaluated (e.g., interpreted) by a receiving UE 110 once the UE 110 is made aware of the schema.

At stage 808, embodiments can map each of multiple VNO-defined slice groups to corresponding value fields of barring information in accordance with the schema. For example, the AMF 620 can inform the UE 110 of a mapping between a number of VNO-defined slice group and some number of bits. Subsequently, the AMF 620 can broadcast barring information by setting some of the bits to '1' and other bits to '0' (e.g., '1' indicates that UE 110 is barred from accessing the S-NSSAI 235 mapped to that bit, and '0' indicates that the UE 110 is allowed access to the S-NSSAI 235 mapped to that bit; or vice versa). In this way, any device that is not registered with the AMF 620 may be able to pick up the broadcast barring information, but will be unable to interpret the information without the schema received during the registration.

At stage 812, embodiments can communicate the barring information to the UE 110 to indicate whether the UE 110 is barred from establishing a communication session via the indicated wildcard-enabled slice group. For example, the AMF 620 broadcasts the barring information to a UE 110 including setting the one or more bits corresponding to the VNO-defined slice groups to respective barring states. Similar to the method 700 of FIG. 7, generating and communicating the barring information in this way permits the VNO 220 to bar an entire slice group without explicitly listing all network slices that are members of the group. However, while the method 700 of FIG. 7 is limited to barring network slice groups that can be uniquely defined as a wildcard-enabled slice group, the method 800 of FIG. 8 permits the VNO 220 full flexibility to define and bar network slice groups as desired.

The remainder of the method 800 can proceed in substantially the same manner as in FIG. 7. At stage 720, embodiments of the UE 110 can receive and locally store the barring information. At some subsequent time, at stage 724, the UE 110 can trigger a session establishment routine for establishing a PDU session, or other suitable communication session, between the UE 110 and the network using the network slice identified by a particular S-NSSAI 235. As part of the routine, at stage 728, the UE 110 can determine whether the requested S-NSSAI 235 is barred according to the barring information received and stored at stage 720 (i.e., whether the requested S-NSSAI 235 is part of a barred VNO-defined slice group). If the S-NSSAI 235 is not barred, a session can be established via the requested S-NSSAI 235 (stage 732). If the S-NSSAI 235 is barred, a session cannot be established via the requested S-NSSAI 235 (stage 734).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for unified access control of network slice groups in a cellular communication network infrastructure, the method comprising:

negotiating, between an access and mobility management function (AMF) and a user equipment device (UE) via a radio access network (RAN), a unified access control schema corresponding to an operator-defined access category that indicates a criteria type configured to support slice grouping;

formatting a slice group identifier and a plurality of network slice identifiers each as a single-network slice selection assistance information (S-NSSAI) identifier having a slice/service type (SST) portion and a slice differentiator (SD) portion, the slice group identifier uniquely identifying an operator-defined group of network slices of a plurality of network slices, each of the plurality of network slices being uniquely identifiable by a network slice identifier separate from the slice group identifier;

uniquely identifying each of the plurality of network slice identifiers by a unique combination of an SST value in the SST portion of its respective S-NSSAI identifier, and an SD value in the SD portion of its respective S-NSSAI identifier;

uniquely identifying, via the slice group identifier, the operator-defined group of network slices as a wildcard-enabled slice group by setting the SST portion of its respective S-NSSAI identifier to a predefined wildcard SST option, and setting the SD portion of its respective S-NSSAI identifier to a predefined wildcard SD value;

mapping the slice group identifier to a corresponding value field of a barring information message in accordance with the unified access control schema; and communicating the barring information message from the AMF to the UE via the RAN to indicate to the UE which of the plurality of network slices of the operator-defined group of network slices is barred from use in establishing communication sessions between the UE and the cellular communication network infrastructure.

2. The method of claim 1, wherein:

setting the SST portion of the slice group identifier to the predefined wildcard SST option and setting the SD portion of the slice group identifier to a particular SD value uniquely identifies the operator-defined group of network slices as the set of the plurality of network slices for which the S-NSSAI identifier of each network slice in the set has the particular SD value in its SD portion; and setting the SD portion of the slice group identifier to the predefined wildcard SD value and setting the SST portion of the slice group identifier to a particular SST value uniquely identifies the operator-defined group of network slices as the set of the plurality of network slices for which the S-NSSAI identifier of each network slice in the set has the particular SST value in its SST portion.

3. The method of claim 2, wherein the criteria type is a network slice identifier criteria type defining each of the value fields of the barring information message to map to a corresponding S-NSSAI identifier.

4. The method of claim 2, wherein setting the SST portion of the S-NSSAI identifier of the wildcard-enabled slice group to the predefined wildcard SST option and setting the SD portion of the S-NSSAI identifier of the wildcard-enabled slice group to a particular SD value uniquely identifies the operator-defined group of network slices as the set of the plurality of network slices for which the respective S-NSSAI identifier of each network slice in the set has the particular SD value in its SD portion.

5. The method of claim 2, wherein setting the SD portion of the S-NSSAI identifier of the wildcard-enabled slice group to the predefined wildcard SD option and setting the SST portion of the S-NSSAI identifier of the wildcard-enabled slice group to a particular SST value uniquely identifies the operator-defined group of network slices as the set of the plurality of network slices for which the respective S-NSSAI identifier of each network slice in the set has the particular SST value in its SST portion.

6. The method of claim 2, wherein:

each value field of the barring information message is a respective portion of a sequence of bits;

the negotiating comprises designating each of the respective portions of the sequence of bits to a corresponding one of multiple S-NSSAI identifiers in a negotiated order, such that a first respective portion of the sequence of bits is designated for the S-NSSAI identifier of the wildcard-enabled slice group, and at least a second respective portion of the sequence of bits is designated for the S-NSSAI identifier of an individual network slice; and the mapping comprises associating each of the multiple S-NSSAI identifiers with the designated respective portions of the sequence of bits and setting the sequence of bits to indicate a barring state of each of at least the wildcard-enabled slice group and the individual network slice.

7. The method of claim 1, wherein:

the operator-defined group of network slices is one of a plurality of operator-defined groups of network slices, each operator-defined group of network slices corresponding to a respective set of the plurality of network slices previously defined by a network operator and uniquely associated at the AMF with a respective slice group identifier of a plurality of slice group identifiers; and the criteria type is a slicing group criteria type defining each of the value fields of the barring information message to map to one of the plurality of slice group identifiers.

8. The method of claim 7, wherein:

each value field of the barring information message is a respective portion of a sequence of bits;

the negotiating comprises designating each of the respective portions of the sequence of bits to a corresponding one of the plurality of slice group identifiers in a negotiated order; and the mapping comprises associating each of the plurality of slice group identifiers with the designated respective portions of the sequence of bits and setting the sequence of bits to indicate a barring state of each of the operator defined slice groups identified by the plurality of slice group identifiers.

9. A system for unified access control of network slice groups in a cellular communication network infrastructure, the system comprising:

a plurality of virtualized data subnetworks built on the cellular communication network infrastructure, each virtualized data subnetwork uniquely being one of a plurality of network slices identifiable by a respective one of a plurality of network slice identifiers; and an access and mobility management function (AMF) node in communication with the plurality of virtualized data subnetworks, in communication with a plurality of user equipment devices (UEs) via one or more radio access networks (RANs), and comprising:

one or more processors; and non-transitory memory having instructions stored thereon, which, when executed, cause the one or more processors to perform steps comprising:

negotiating a unified access control schema corresponding to an operator-defined access category that indicates a criteria type configured to support slice grouping;

mapping a slice group identifier to a corresponding value field of a barring information message in accordance with the unified access control schema, the slice group identifier uniquely identifying an operator-defined group of network slices of the plurality of network slices, wherein:

the slice group identifier and the plurality of network slice identifiers are each formatted as a single-network slice selection assistance information (S-NSSAI) identifier having a slice/service type (SST) portion and a slice differentiator (SD) portion;

each of the plurality of network slice identifiers is uniquely identified by a unique combination of an SST value in the SST portion of its respective S-NSSAI identifier, and an SD value in the SD portion of its respective S-NSSAI identifier; and the slice group identifier uniquely identifies the operator-defined group of network slices as a wildcard-enabled slice group by setting the SST portion of its respective S-NSSAI identifier to a predefined wildcard SST option, and setting the SD portion of its respective S-NSSAI identifier to a predefined wildcard SD value; and communicating the barring information message to at least one of the plurality of UEs via the RAN to indicate which of the plurality of network slices of the operator-defined network slices is barred from use in establishing communication sessions between the at least one of the plurality of UEs and the cellular communication network infrastructure.

10. The system of claim 9, wherein:

setting the SST portion of the slice group identifier to the predefined wildcard SST option and setting the SD portion of the slice group identifier to a particular SD value uniquely identifies the operator-defined group of network slices as the set of the plurality of network slices for which the S-NSSAI identifier of each network slice in the set has the particular SD value in its SD portion; and setting the SD portion of the slice group identifier to the predefined wildcard SD value and setting the SST portion of the slice group identifier to a particular SST value uniquely identifies the operator-defined group of network slices as the set of the plurality of network slices for which the S-NSSAI identifier of each network slice in the set has the particular SST value in its SST portion.

11. The system of claim 10, wherein the criteria type is a network slice identifier criteria type defining each of the value fields of the barring information message to map to a corresponding S-NSSAI identifier.

12. The system of claim 10, wherein setting the SST portion of the S-NSSAI identifier of the wildcard-enabled slice group to the predefined wildcard SST option and setting the SD portion of the S-NSSAI identifier of the wildcard-enabled slice group to a particular SD value uniquely identifies the operator-defined group of network slices as the set of the plurality of network slices for which the respective S-NSSAI identifier of each network slice in the set has the particular SD value in its SD portion.

13. The system of claim 10, wherein setting the SD portion of the S-NSSAI identifier of the wildcard-enabled slice group to the predefined wildcard SD option and setting the SST portion of the S-NSSAI identifier of the wildcard-enabled slice group to a particular SST value uniquely identifies the operator-defined group of network slices as the set of the plurality of network slices for which the respective S-NSSAI identifier of each network slice in the set has the particular SST value in its SST portion.

14. The system of claim 9, wherein:

the operator-defined group of network slices is one of a plurality of operator-defined groups of network slices, each operator-defined group of network slices corresponding to a respective set of the plurality of network slices previously defined by a network operator and uniquely associated at the AMF with a respective slice group identifier of a plurality of slice group identifiers; and the criteria type is a slicing group criteria type defining each of the value fields of the barring information message to map to one of the plurality of slice group identifiers.

15. A non-transitory computer-readable medium comprising instructions that, when executed by one or more processors, cause the one or more processors to perform operations comprising:

negotiating, between an access and mobility management function (AMF) and a user equipment device (UE) via a radio access network (RAN), a unified access control schema corresponding to an operator-defined access category that indicates a criteria type configured to support slice grouping;

formatting a slice group identifier and a plurality of network slice identifiers each as a single-network slice selection assistance information (S-NSSAI) identifier having a slice/service type (SST) portion and a slice differentiator (SD) portion, the slice group identifier uniquely identifying an operator-defined group of network slices of a plurality of network slices, each of the plurality of network slices being uniquely identifiable by a network slice identifier separate from the slice group identifier;

uniquely identifying each of the plurality of network slice identifiers by a unique combination of an SST value in the SST portion of its respective S-NSSAI identifier, and an SD value in the SD portion of its respective S-NSSAI identifier;

uniquely identifying, via the slice group identifier, the operator-defined group of network slices as a wildcard-enabled slice group by setting the SST portion of its respective S-NSSAI identifier to a predefined wildcard SST option, and setting the SD portion of its respective S-NSSAI identifier to a predefined wildcard SD value;

mapping a slice group identifier to a corresponding value field of a barring information message in accordance with the unified access control schema; and communicating the barring information message from the AMF to the UE via the RAN to indicate to the UE which of the plurality of network slices of the operator-defined group of network slices is barred from use in establishing communication sessions between the UE and the cellular communication network infrastructure.

16. The non-transitory computer-readable medium of claim 15, wherein:

setting the SST portion of the slice group identifier to the predefined wildcard SST option and setting the SD portion of the slice group identifier to a particular SD value uniquely identifies the operator-defined group of network slices as the set of the plurality of network slices for which the S-NSSAI identifier of each network slice in the set has the particular SD value in its SD portion; and setting the SD portion of the slice group identifier to the predefined wildcard SD value and setting the SST portion of the slice group identifier to a particular SST value uniquely identifies the operator-defined group of network slices as the set of the plurality of network slices for which the S-NSSAI identifier of each network slice in the set has the particular SST value in its SST portion.

17. The non-transitory computer-readable medium of claim 16, wherein the criteria type is a network slice identifier criteria type defining each of the value fields of the barring information message to map to a corresponding S-NSSAI identifier.

18. The non-transitory computer-readable medium of claim 16, wherein setting the SST portion of the S-NSSAI identifier of the wildcard-enabled slice group to the predefined wildcard SST option and setting the SD portion of the S-NSSAI identifier of the wildcard-enabled slice group to a particular SD value uniquely identifies the operator-defined group of network slices as the set of the plurality of network slices for which the respective S-NSSAI identifier of each network slice in the set has the particular SD value in its SD portion.

19. The non-transitory computer-readable medium of claim 16, wherein setting the SD portion of the S-NSSAI identifier of the wildcard-enabled slice group to the predefined wildcard SD option and setting the SST portion of the S-NSSAI identifier of the wildcard-enabled slice group to a particular SST value uniquely identifies the operator-defined group of network slices as the set of the plurality of network slices for which the respective S-NSSAI identifier of each network slice in the set has the particular SST value in its SST portion.

20. The non-transitory computer-readable medium of claim 16, wherein:

each value field of the barring information message is a respective portion of a sequence of bits;

the negotiating comprises designating each of the respective portions of the sequence of bits to a corresponding one of multiple S-NSSAI identifiers in a negotiated order, such that a first respective portion of the sequence of bits is designated for the S-NSSAI identifier of the wildcard-enabled slice group, and at least a second respective portion of the sequence of bits is designated for the S-NSSAI identifier of an individual network slice; and the mapping comprises associating each of the multiple S-NSSAI identifiers with the designated respective portions of the sequence of bits and setting the sequence of bits to indicate a barring state of each of at least the wildcard-enabled slice group and the individual network slice.

* * * * *